United States Patent [19]

Hendley et al.

[11] Patent Number: 4,872,812

[45] Date of Patent: Oct. 10, 1989

[54] TURBINE BLADE PLATEFORM SEALING AND VIBRATION DAMPING APPARATUS

[75] Inventors: David G. Hendley, Wyoming; William A. Litzinger, Cincinnati, both of Ohio

[73] Assignee: General Electric Company, Cincinnati, Ohio

[21] Appl. No.: 81,773

[22] Filed: Aug. 5, 1987

[51] Int. Cl.[4] .............................................. F01D 5/22
[52] U.S. Cl. ............................... 416/190; 416/193 A; 416/500
[58] Field of Search ............... 416/193 A, 193 R, 190, 416/500, 219 R, 220 R, 191

[56] References Cited

U.S. PATENT DOCUMENTS

| | | | |
|---|---|---|---|
| 2,912,223 | 11/1959 | Hull | 416/221 |
| 2,999,631 | 9/1961 | Wollmershauser | 416/193 R X |
| 3,295,825 | 1/1967 | Hall | 416/193 A |
| 3,666,376 | 5/1972 | Damlis | 416/220 R X |
| 3,918,842 | 11/1975 | Longley et al. | 416/193 A |
| 3,936,222 | 2/1976 | Asplund et al. | 416/193 A X |
| 4,101,245 | 7/1978 | Hess et al. | 416/193 A X |
| 4,177,013 | 12/1979 | Patterson et al. | 416/193 A |
| 4,455,122 | 6/1984 | Schwarzmann et al. | 416/193 A |
| 4,505,642 | 3/1985 | Hill | 416/193 A |
| 4,743,164 | 5/1988 | Kalogeros | 416/221 X |

FOREIGN PATENT DOCUMENTS

| | | | |
|---|---|---|---|
| 418618 | 8/1974 | U.S.S.R. | 416/193 A |
| 1518076 | 7/1978 | United Kingdom . | |

Primary Examiner—Everette A. Powell, Jr.
Attorney, Agent, or Firm—Derek P. Lawrence; Craig M. Gregersen

[57] ABSTRACT

A gas turbine rotor blade platform sealing and damping system has elongated symmetrical insert elements of equilateral triangular cross-section loosely received within complementary shaped pockets at the spacing gaps between opposing convex and concave airfoil side edges of adjacently mounted blade platforms. The inserts and pockets are relatively configured to provide self-orientation of the inserts into gap sealing and vibration damping engagement with the platform edges when acted upon by centrifugal force due to rotor rotation. The convex platform edge is thickened at the point of closest proximity with the convex side of the airfoil. Alternative embodiments utilize insert grooves for increased leakage of cooling gas past the platform edges and incorporate a central bore for mass reduction.

18 Claims, 2 Drawing Sheets

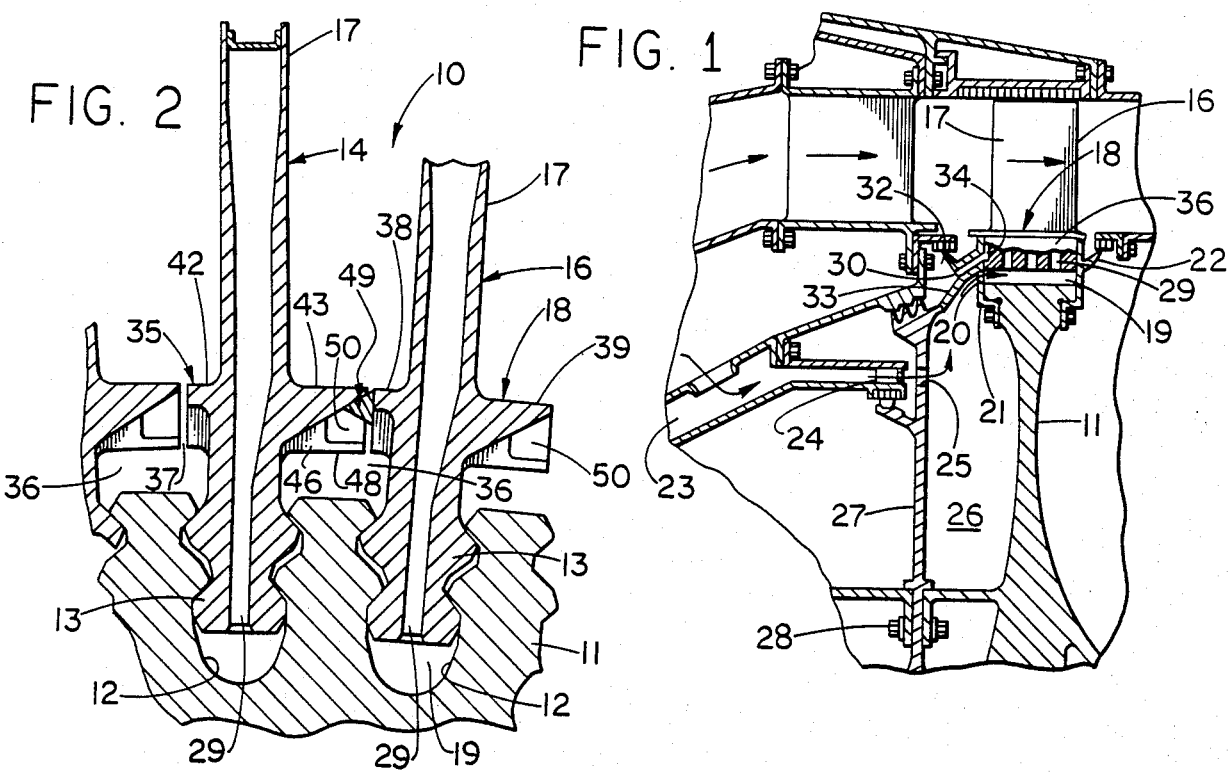
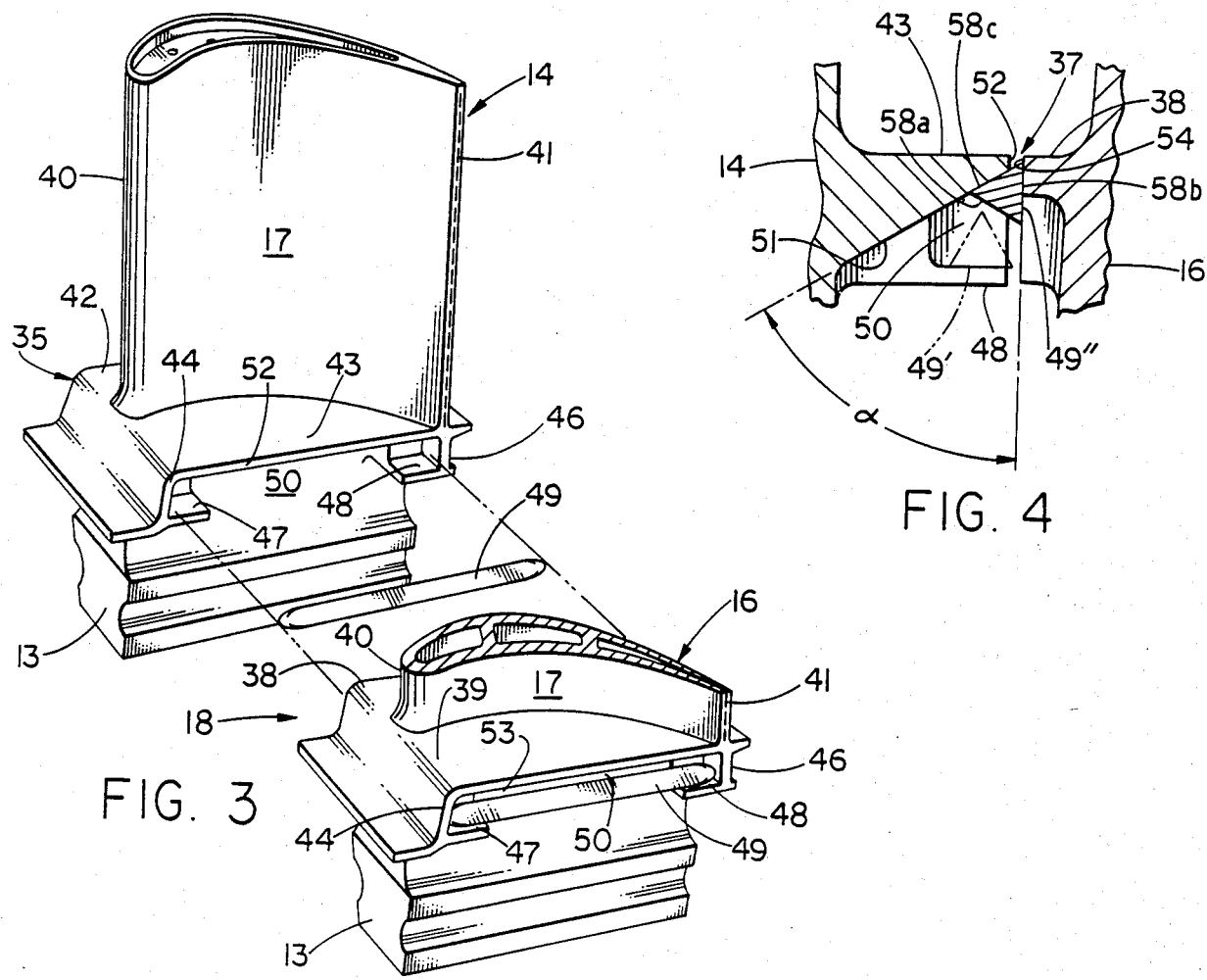

TURBINE BLADE PLATEFORM SEALING AND VIBRATION DAMPING APPARATUS

This invention relates to platform sealing and vibration damping apparatus for a gas turbine engine; and, in particular, to a sealing and damping system that utilizes an insert between the edges of opposing blade platforms.

BACKGROUND OF THE INVENTION

Gas turbine engines to which the present invention applies typically have a multiplicity of blades or buckets mounted in adjacent positions extending radially about the periphery of a rotor wheel or disc. Each blade is formed with integral airfoil, platform and root sections, and is mounted platform edge-to-platform edge across a spacing gap with an adjacent blade.

There exists a need in such arrangements to appropriately cool the blades so as to enable them to withstand exposure to high temperature gases. Cooling of the blades is commonly accomplished in part by the circulation of cooler gas in and around the root portion of the blades. An arrangement to seal the gaps between adjacent blades is commonly provided to keep the hot gases from flowing below the platforms and to prevent the outward flow of cooling gases from upsetting the main gas flow.

There also exists a need to dampen the vibration during engine operation between the rotor disc and blades, and between the blades themselves. The occurrence and degree of this vibration is a function of many factors including gas temperature, turbine speed and the method by which the blades are retained within the rotor. Unchecked vibration may lead to blade fatigue failure and cause complications to retaining the blades within the disc.

Prior art blade platform gap sealing and vibration damping arrangements are known that utilize an elongated insert fitted into a complementary shaped slot or pocket formed between the platform edges of adjacent blade structures, so that centrifugal forces acting on the element upon rotation of the rotor drive the insert radially outward to contact the opposing platform edges and seal the gap.

Assembly of such prior art gap sealing systems is, however, time-consuming and costly, typically requiring the careful orientation and positioning of each small insert element into its respective corresponding slot. If an element is inserted with the wrong orientation, proper sealing and damping is precluded. Also, the tolerance needed to ensure proper orientation between the insert and the slot may be so close that centrifugal forces wedge the insert too tightly in the slot, totally blocking cooling of the platform edges. Moreover, on some blade designs there is insufficient room to accommodate such an insert sealing and damper arrangement because of the close proximity of the airfoil to the platform edge in the region of maximum airfoil thickness.

SUMMARY OF THE INVENTION

It is an object of the present invention to overcome the above and other drawbacks of the prior art by providing a platform sealing and damping system for a gas turbine engine which has an insert element that is self-orienting relative to opposing platform edges so that it can be easily installed without the need for alignment or orientation.

In one aspect of the invention, a sealing and damping system includes an insert element that can be loosely received between opposing platform edges of adjacently mounted rotor blades, with the surfaces of the insert relatively configured and arranged to interact with the surfaces of the opposing platform edges to enable the insert element to orient itself into gap sealing position when subjected to normal centrifugal forces experienced upon rotation of the rotor.

The platform edge of one rotor blade is formed with a pocket whose radial outer extent is defined by a sloped planar surface or bevel, and the opposing platform edge of an adjacently mounted blade has a planar surface, positioned relative to the sloped surface of the one blade so that the planes of the two surfaces converge outwardly at an angle of convergence $\alpha$ toward a spacing gap left between the opposing edges. An insert element received in the pocket has planar surfaces arranged about a central axis, with the insert surfaces configured and positioned so that irrespective of the orientation with which the insert element is received within the pocket, centrifugal forces generated during rotation of the rotor will drive one surface of the insert into sealing engagement with the sloped planar surface of the platform edge of the one blade and will drive another surface of the insert into sealing engagement with the planar surface of the opposing platform edge of the adjacent blade.

In a preferred embodiment, the planar surfaces of the insert element are arranged symmetrically about its axis, with the planes of adjacent element surfaces converging axially clockwise and axially counterclockwise at the same angle of convergence $\alpha$ as the angle of convergence of the planes of the opposing platform edge surfaces. An exemplary system utilizing an insert with surfaces axially arranged to present a regular polygonal cross-section (viz. an equilateral triangular cross-section) is described in greater detail below.

BRIEF DESCRIPTION OF THE DRAWINGS

Embodiments of the invention have been chosen for purposes of illustration and description, and are shown in the accompanying drawings, wherein:

FIG. 1 is a fragmentary, longitudinal section through a turbine rotor and blade arrangement of the type embodying the present invention;

FIG. 2 is a fragmentary axial section through one stage of turbine blades employing the present invention;

FIG. 3 is an exploded perspective view of the invention as applied to adjacent blades;

FIG. 4 is an enlarged view of a part of FIG. 2 useful in understanding the principles of operation of the invention.

Throughout the drawings, like elements are referred to by like numerals.

DESCRIPTION OF THE PREFERRED EMBODIMENT

Figure 5:
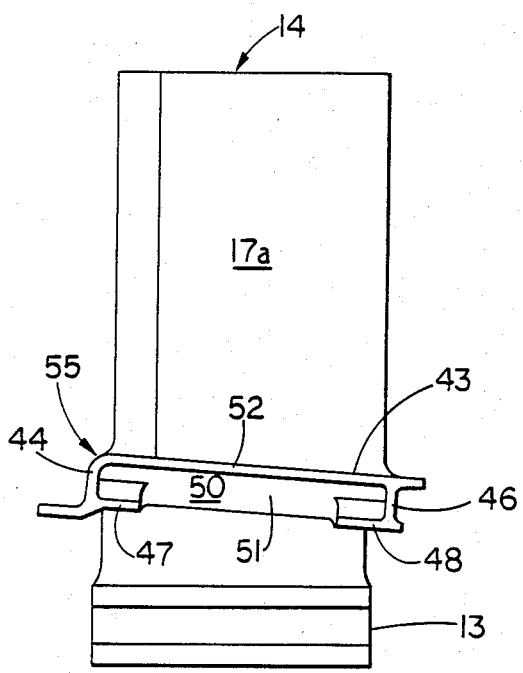
FIG. 5 is a concave airfoil side elevation view of a blade of FIG. 1.

Referring now to the drawings, reference is directed initially to FIGS. 1 and 2 wherein a blade platform sealing and damping system embodying the principles of the invention is shown generally at 10 as being applied to a turbine disc or wheel 11 having a plurality of axially extending slots or dovetails 12 formed in the periphery thereof in circumferentially spaced positions. Disposed in each of the dovetail slots 12 is a radially projecting blade having a root portion with a base or tang 13 whose shape conforms essentially to that of the dovetail slot 12 so as to be frictionally secured thereby during operational rotation of the rotor, in a manner well known in the art. The blades are substantially identical in structure, as can be seen by FIG. 2 wherein a pair of adjacent blades are designated as 14 and 16, respectively. The blade 16 is substantially identical to blade 14 and comprises a cambered airfoil portion 17 which projects into the hot gas stream of the turbine as is well known in the art. A platform portion 18 is provided at the base of the airfoil portion to partially define the inner bounds of the hot gas flow through the blade row.

As can be seen from FIG. 2, the dovetail slots 12 have a depth greater than the dovetail height of the root 13 to facilitate insertion of the tangs therein and to facilitate delivery of cooling air to the tangs 13. The space between the bottom of the tangs 13 and the bottom of the dovetail slots 12, generally designated by the numeral 19, is supplied with cooling air by means of a plurality of holes 20 formed in the upstream blade retainer 21 (FIG. 1). The upstream and downstream blade retainers 21 and 22, respectively, act to restrain axial movement of the blade. Typically, the cooling air is delivered to the dovetail slot 12 (or space 19) from the compressor (not shown) by a passageway 23, which includes a stationary expander nozzle 24 to further cool the air as is well known in the art. Air flows through the expander 24, through a plurality of holes 25 and into a chamber 26 formed by the upstream face of the turbine rotor disc 11, a second rotating disc 27, and the upstream blade retainer 22. The disc 27 is coupled for rotation with the turbine rotor disc 11 by means of a plurality of bolts 28.

From the chamber 26 the cooling air then flows through the holes 20 in the upstream blade retainer and into the space 19 within the dovetail slots 12. From the slots 12 the air is delivered to the interior portion of the blade 16 in any known manner. In the present example, the air is delivered through a plurality of radially extending passages 29 formed within the root portions 13. In addition to the cooling air holes 20, it may be desirable to have a second row of cooling air holes 30 which are positioned radially outwardly therefrom as shown in FIG. 1 to deliver cooling air from the chamber 32 to the rim of the turbine rotor disc 11. In an alternative design, the cooling air holes 30 can be eliminated and any necessary cooling air from the turbine rotor disc rim can be allowed to leak (CDP leakage) between a projection 33, which abuts the face of the turbine rotor blade shanks, and the turbine rotor disc rim. The projection 33 then, in addition to providing the basic function of preventing axial movement of the blade 16 within the dovetail slot 12, also acts to perform a sealing function.

The CDP leakage air enters through hole 30 in the forward blade retainer/seal 21, passes through the plenum 34, and then into a chamber 36 (FIG. 2) to cool the upper portion of the blade dovetails and the platforms 35 and 18. In addition to the CDP leakage air from plenum 34, some of the cooling air from the chamber 19 leaks between the blade and disc dovetail tang pressure faces and into the chamber 36. One of the principal objects of the present invention is to prevent hot gases from the main gas stream from coming below the platforms and to control the leakage of this combined cooling air flow in the chamber 36 up through the blade platform gaps indicated by the numeral 37 in FIG. 2 and into the main gas stream of the turbine indicated by the arrows in FIG. 1.

The blade platform 18 associated with the blade 16 comprises a short side 38 and a long side 39 projecting tangentially in opposite directions and generally extending axially beyond the leading and trailing edges 40 and 41 of the blade as shown in FIG. 3. The short side 38 is on the convex side of the airfoil 17, and the long side 39 is on the concave side. Similarly, the adjacent blade 14 has a platform with the short side 42 and long side 43 extending mutually toward the short side 38 of blade 16 to partially define the chamber 36 along with the upper portions of the blade dovetails 13, the outside diameter of the disc 11 and the forward and after blade retainers 22 and 30. Depending from the edge on the long side 43 of blade platform 35, in a radially inward direction, is a pair of axially spaced platform wings 44 and 46 having mutually extending, axially oriented flanges 47 and 48, respectively, attached thereto to form a pocket 50 at the edge of the platform 35 for receiving a seal/damper insert 49. Similarly, the edge of the long side 39 of blade platform 18 has a similar pocket structure 50 for receiving a like seal/damper element 49 in the adjacent blade 16 (FIG. 3).

Referring now to FIG. 4, it can be seen that the edge of the platform long side 43 of blade 14 has an underside bevelled or wear surface 51 which slants radially outward toward its tip 52. This wear surface 51 is generally planar in form and acts as a frictional base with which the seal/damper 49 can be frictionally engaged. The opposing edge of the platform short side 38 of the adjacently mounted blade 16 has at its tip an abutting surface 54 which together with the tip 52 forms the gap 37 for which a sealing function is desired. The gap 37 is provided between the opposing platform edges for well-known reasons, such as the accommodation of thermal expansions of the blades 14, 16. Abutting surface 54 is generally planar in form and aligned in a substantially radially extending plane. As can be seen by reference to FIG. 4, the abutting surface 54 extends radially inwardly further than the opposite tip 52 so as to expose a portion thereof to the wear surface 51. It is this feature which accommodates the damping function of the seal as will be more clearly described hereafter. Referring again to the seal/damper insert element 49, there is formed thereon a plurality of insert element surfaces 58 which, as explained more fully below, are adapted in operation so that one element surface will engage the platform edge surface 51 and another element surface will engage the opposing platform edge surface 54 so as to cause a damping effect to offset vibrational forces in the blade.

Figure 6:
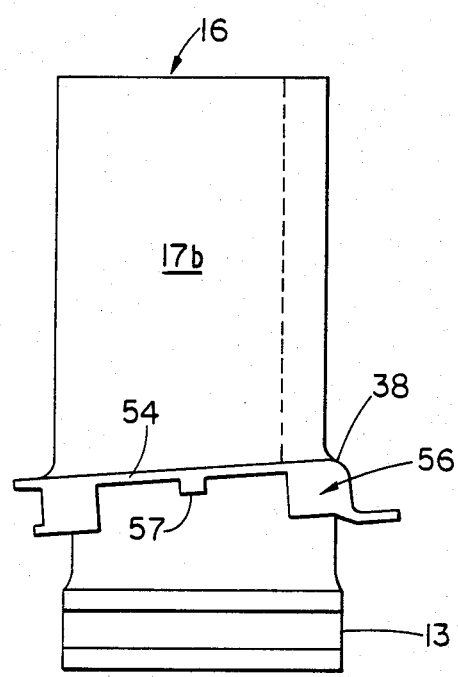
FIG. 6 is a convex airfoil side elevation view of an adjacent blade of FIG. 1.

FIGS. 5 and 6 are side elevation views showing the opposing edges of adjacently mounted blades 14 and 16 more clearly. FIG. 5 shows the blade 14 as viewed from its concave airfoil side 17a; FIG. 6 shows blade 16 as viewed from its convex airfoil side 17b. As seen in FIG. 5, the platform edge on the long side 43 of the platform 35 is formed with a planar surface portion 55 made up of the edges of the wings 44, 46, the flanges 47, 48 and the tip 52. The surface 55 of the edge of the long side 43 extends radially inwardly at the wings 44, 46, down around the sides of the pocket 50 and ends at the centrally directed flanges 47, 48. The planar surface 55 surrounds the central opening of the pocket 50 into which the insert element 49 is loosely received. The flanges 47, 48 provide inner stops to define the radial inner boundaries of the pocket 50 and capture the ends of the insert element 49 at low rotor rotation. The pocket 50 is bounded at its radially outward extent by the bevelled planar surface 51. The opposing platform edge on the short side 38 of the platform 18 of the adjacently mounted blade 16 has a planar surface portion 56 (FIG. 6), preferably configured to extend parallel to the opposing surface portion 55 (FIG. 5) of blade 14. The surface 54 of blade 16 is wider (i.e. has a greater radial extension) than the opposing surface of tip 52. The surfaces 51 and 54 are relatively configured and positioned to converge toward each other at the gap 37 at an angle of convergence (see FIG. 4).

FIG. 6 shows the preferred configuration for the convex platform edge surface 56 of the blade 14. The blade 16 has a smooth transition from the top of its root portion 13 to the bottom of the platform edge at the platform surface 54, presenting a hollowed out area in the central underside region at the short side 38 of platform 18. To accommodate wide airfoil designs while maintaining blade strength at the place of closest proximity of the convex side 17b of the airfoil 17 to the platform edge, the width of the surface 54 is left greater by providing less undercut.

Figure 7:
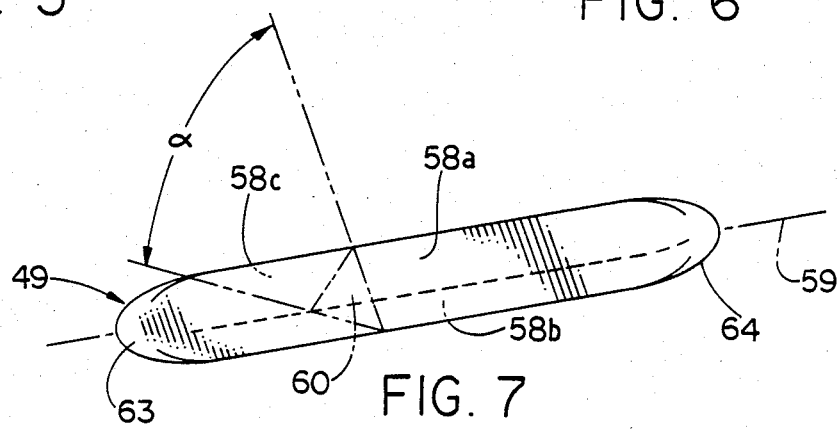
FIG. 7 is a perspective view of a preferred form of seal/damper insert element of FIG. 1.

FIG. 7 shows a preferred form of insert element 49 to be loosely received within the pocket 50 formed between the opposing platform edges of adjacent blades 14, 16. The preferred element 49 has a plurality of planar surface portions 58 arranged about its longitudinal axis 59 with each surface 58a configured and positioned to converge at an angle α with respect to a surface 58b located axially clockwise thereof and to converge at the same angle α with respect to another surface 58c located axially counterclockwise thereof. It is preferred to arrange the surfaces 58 symmetrically about the central axis 59 of insert 49 such as, for example, shown by the regular polygonal cross-sectional arrangement of FIG. 7. The angle α at which the surfaces 58 converge is made to match the angle α of convergence of the surfaces 51 and 54 (see FIG. 4) of the opposing platform edge surfaces 51, 54 of adjacently mounted blades 14, 16.

The specific embodiment of insert element 49 depicted in FIG. 7 has three planar surfaces 58a, 58b, 58c symmetrically arranged about the central axis 59 to provide an equilateral triangular cross-section 60 with an angle of convergence α of sixty degrees. The ends 63, 64 of the insert 49 are preferably rounded, such as by chamfering.

The element 49 is configured and positioned relative to the surfaces 51 and 54 so that, regardless of which surface 58 of insert 49 is located near the surface portion 51 of the pocket 50 in the assembled structure of FIGS. 1 and 2, centrifugal forces exerted on element 49 at high rotor rotation will drive one surface 58 into gap sealing engagement with surface 59 of one blade and another surface 58 into gap sealing engagement with surface 54 of an adjacent blade. This will seal the gap 37 against uncontrolled communication between the hot gas region above the platforms 18, 35 and the cooling gas region below.

The operation of the self-orienting feature of insert elements 49 received within respective pockets 50 between adjacent platform edges of adjacent blades 14, 16 is illustrated by FIG. 4. FIG. 4 shows an insert element in its dot-and-dashed rest position 49', loosely received within the confines of a pocket 50 at low rotor rotation. Flanges 47, 48 (see FIG. 3) capture the ends of the insert 49' against further radially inward movement. As rotor rotation is increased, centrifugal forces exerted on element 49 throw the element 49 radially outward against the converging surfaces 51, 54 toward the gap 37, driving the insert into the position 49'' shown in solid lines, with one of the surfaces 58 (e.g. 58b) pressed against the surface 54 of blade 16 and another of the surfaces 58 (e.g. 58c) pressed against the surface 51 of the adjacently mounted blade 14. This acts to seal the spacing gap 37 between the opposing platform edges 52, 54 of blades 14, 16 against the uncontrolled flow of gases between regions above and below the platforms 35 and 18. Moreover, friction forces created by the forceful engagement of the two surfaces 58 (e.g. 58b and 58c) against the respective surfaces 54, 51 will act to oppose relative movement of those surfaces, thereby providing a damping action to counteract the vibration of the individual blades 14, 16. The self-orienting feature of insert 49 greatly simplifies insertion over that of prior art arrangements. Complete access to the underside of the platforms is not required and sealing or damping failure due to wrong orientation is eliminated.

Figure 8:
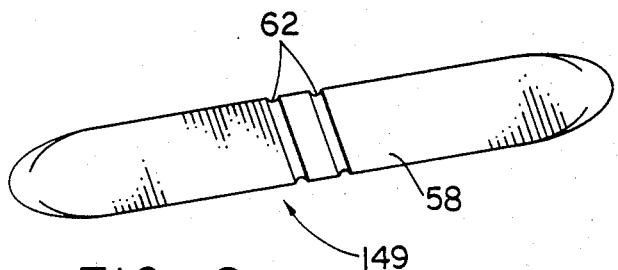
FIGS. 8 and 9 are perspective views of alternative embodiments of the insert element of FIG. 7.
Figure 9:
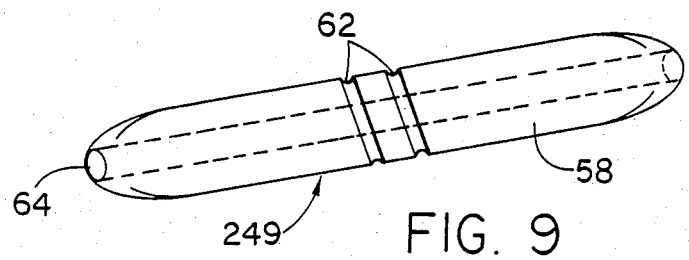

FIGS. 8–9 illustrate alternative embodiments 149 and 249 of insert element 49. The insert element 149 shown in FIG. 8 is formed with grooves 62 which interrupt the sealing action of the surfaces 58 in operation to permit greater control over the leakage of cooling gas from below the platforms 35, 18 of adjacently mounted blades 14, 16. Grooves 62 are advantageous, for example, to increase the outward flow of purge gas to cool edges 52, 54 where normal non-grooved surfaces would otherwise seal too tightly. The element 249 shown in FIG. 9, additionally includes a central bore 64 which runs the length of the insert element 249 to reduce the mass of the element, without interfering with the controlled sealing effects.

Various substitutions and modifications may be made without departing from the spirit and scope of the present invention as defined by the claims appended hereto. In particular, it will be appreciated that other arrangements of the surfaces 58, with corresponding selection of the angle α and configuration and positioning of the surfaces 51, 54 of the platforms 18, 35 are possible while still realizing the advantages and benefits of the invention.

What is claimed is:

1. An insert element to be loosely received between first and second opposing and converging edge surfaces of adjacent blade platforms of a rotor of a gas turbine engine and, in response to centrifugal forces acting thereon due to high rotor rotation speed, to seal a gap between the edge surfaces and to dampen vibration of the blades, said element comprising:
an elongated body having a longitudinal axis and at least three element surfaces configured and arranged symmetrically about said longitudinal axis so that, irrespective of the orientation with which said element is received between the platform edges, the centrifugal forces will drive one of said element surfaces into sealing engagement against the first edge surface and will drive another of said element surfaces into sealing engagement against the second edge surface.

2. An element as in claim 1, wherein said element surfaces are generally planar surfaces arranged about said longitudinal axis so that said insert element has a regular polygonal cross-section.

3. An element as in claim 2, wherein said cross-section is an equilateral triangle.

4. An element as in claim 3, wherein the ends of said insert element are rounded.

5. An element as in claim 1, wherein said insert element is provided with a groove running circumferentially across said surfaces about said axis.

6. An element as in claim 1, wherein said insert element is formed with a bore configured and positioned to reduce the mass of said element without interfering with the sealing engagement of said element with said edge surfaces.

7. Apparatus for sealing a gap between opposing edges of adjacent blades of a rotor of a gas turbine engine, and for damping vibration of the blades, wherein said adjacent blades comprise a first blade having a first platform edge, and a second blade having a second platform: edge, said first and second blades being adjacently mounted on said rotor with said first and second platform edges opposingly positioned across a gap; said apparatus comprising:

an elongated insert element loosely received between said first and second platform edges and having a longitudinal axis and a plurality of generally planar element surfaces configured and arranged symmetrically about said axis so that, irrespective of the angular orientation about said axis with which said insert element is received between said edges, centrifugal forces acting upon said insert element due to rotor rotation will drive one of said element surfaces into sealing engagement against said first platform edge and another of said element surfaces into sealing engagement against said second platform edge.

8. Apparatus as in claim 7, wherein said element surfaces are arranged about said axis so that said insert element has a regular polygonal cross-section.

9. Apparatus as in claim 8, wherein said cross-section is an equilateral triangle.

10. Apparatus as in claim 9, wherein said insert element is provided with a groove running circumferentially across said surfaces about said axis.

11. Apparatus as in claim 10 wherein said insert element is formed with a bore configured and positioned to reduce the mass of said element without interfering with the sealing engagement of said element surfaces against said edges.

12. A system for sealing a gap between opposing platform edges of adjacent blades of a rotor of a gas turbine engine, and for damping vibration of the blades, comprising:

a first blade having a first platform edge including a first generally planar edge surface;

a second blade having a second platform edge including a second generally planar edge surface; said first and second blades being adjacently mounted on said rotor with said first and second platform edges opposingly positioned across a gap and with said first and second edge surfaces relatively configured and positioned to converge radially outwardly toward said gap at an angle of convergence $\alpha$ and to define the radial outer boundaries of an elongated pocket formed between said platform edges; and an elongated insert element loosely received within said pocket and having a plurality of generally planar element surfaces relatively configured and arranged about a central axis so that, irrespective of the orientation with which said insert element is received within said pocket, centrifugal forces acting upon said insert element due to rotor rotation will drive one of said element surfaces into sealing engagement against said first edge surface and another of said element surfaces into sealing engagement against said second edge surface.

13. A system as in claim 12, wherein said second platform edge further comprises a third generally planar edge surface located radially outward of said second edge surface and which is parallel to and opposes said first edge surface across said gap.

14. A system as in claim 13, wherein said third edge surface extends perimetally, radially down and around the sides of said second platform edge to define the sides of said pocket, and extends at least partially toward the center at the bottom of each side of said edge to define the radial inner boundaries of said pocket.

15. A system as in claim 13, wherein said element surfaces all have similar configuration and size and are arranged symmetrically about said central axis.

16. A system as in claim 15, wherein said insert element has an equilateral triangular cross-section, and wherein the angle of convergence $\alpha$ is sixty degrees.

17. A system as in claim 13, wherein the width of said first edge surface exceeds the corresponding width of the third edge surface in the central areas of the opposing edges by an amount equal to at least one-half the width of said element surfaces.

18. A system as in claim 12, wherein said first and second blades comprise integrally formed airfoil and platform sections, said airfoil section having convex and concave sides; wherein said first platform edge is on the convex airfoil side of said blade and said second platform edge is on the concave airfoil side of said blade; and wherein said first edge surface includes a thickened portions at the point of closest proximity of said convex side of said airfoil to said first platform edge.

* * * * *